(12) United States Patent
Uchida et al.

(10) Patent No.: US 10,447,098 B2
(45) Date of Patent: Oct. 15, 2019

(54) ROTATING ELECTRICAL MACHINE WITH COOLING CHANNELS

(71) Applicant: Mitsubishi Electric Corporation, Chiyoda-ku, Tokyo (JP)

(72) Inventors: Yosuke Uchida, Tokyo (JP); Naoki Yamamoto, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 118 days.

(21) Appl. No.: 15/308,032

(22) PCT Filed: Oct. 16, 2014

(86) PCT No.: PCT/JP2014/077536
§ 371 (c)(1),
(2) Date: Oct. 31, 2016

(87) PCT Pub. No.: WO2016/059700
PCT Pub. Date: Apr. 21, 2016

(65) Prior Publication Data
US 2017/0047800 A1    Feb. 16, 2017

(51) Int. Cl.
 *H02K 1/26* (2006.01)
 *H02K 1/32* (2006.01)
 *H02K 3/34* (2006.01)

(52) U.S. Cl.
 CPC .............. *H02K 1/265* (2013.01); *H02K 1/32* (2013.01); *H02K 3/345* (2013.01)

(58) Field of Classification Search
 CPC ........... H02K 1/265; H02K 1/32; H02K 3/345
 (Continued)

(56) References Cited

U.S. PATENT DOCUMENTS

| 4,859,891 A * | 8/1989 | Jenkins | H02K 3/24 310/215 |
| 6,265,805 B1 * | 7/2001 | Debleser | H02K 1/26 310/214 |

(Continued)

FOREIGN PATENT DOCUMENTS

| JP | S 54-179407 U | 12/1979 |
| JP | S58-108745 U1 | 7/1983 |

(Continued)

OTHER PUBLICATIONS

Machine translation of JP 09009542 A (Jan. 1997).*
Machine translation of JP 09009542 A. (Year: 1997).*
Extended European Search Report dated Mar. 8, 2018, issued by the European Patent Office in corresponding European Application No. 14904092.5. (9 pages).

(Continued)

*Primary Examiner* — Michael Andrews
(74) *Attorney, Agent, or Firm* — Buchanan Ingersoll & Rooney PC

(57) ABSTRACT

A rotating electrical machine includes: a rotor core in which a slot passing therethrough is provided; a rotor winding which coil end portion is extended on the axially outer side than the core end face of the rotor core; a U-shaped channel which is arranged on the slot of the rotor core, is touched to come into contact with a bottom portion of the rotor winding, and is axially extended to be projected on the axially outer side than the core end face of the rotor core; a slot cell which insulates the rotor winding and the U-shaped channel from the rotor core; and an interposed piece arranged between the rotor windings at a portion more projected than the core end face of the rotor core. The projected end face of the U-shaped channel is arranged on the axially inner side than the projected end face of the interposed piece.

13 Claims, 6 Drawing Sheets

(58) Field of Classification Search
USPC .......................................................... 310/215
See application file for complete search history.

(56) References Cited

U.S. PATENT DOCUMENTS

| | | | |
|---|---|---|---|
| 6,340,853 B1 | 1/2002 | Kaiho et al. | |
| 2007/0236100 A1 | 10/2007 | Parsania et al. | |

FOREIGN PATENT DOCUMENTS

| | | | | |
|---|---|---|---|---|
| JP | S 63-182649 U | 11/1988 | | |
| JP | H 01-270747 A | 10/1989 | | |
| JP | H 06-105492 A | 4/1994 | | |
| JP | 09009542 A | * 1/1997 | ............... | H02K 3/24 |
| JP | 09009542 A | * 1/1997 | ............... | H02K 1/32 |
| JP | H09-009542 A | 1/1997 | | |
| JP | H 11-150898 A | 6/1999 | | |
| JP | 2001-258190 A | 9/2001 | | |
| JP | 2001-518277 A | 10/2001 | | |
| JP | 2007-282488 A | 10/2007 | | |
| JP | 2010-057318 A | 3/2010 | | |

OTHER PUBLICATIONS

International Search Report (PCT/ISA/210) dated Jan. 6, 2015, by the Japan Patent Office as the International Searching Authority for International Application No. PCT/JP2014/077536.

Written Opinion (PCT/ISA/237) dated Jan. 6, 2015, by the Japan Patent Office as the International Searching Authority for International Application No. PCT/JP2014/077536.

Office Action (Notification of Reasons for Refusal) dated Jun. 20, 2017, by the Japanese Patent Office in corresponding Japanese Patent Application No. 2016-553925 and English translation of the Office Action. (10 pages).

Office Action dated Jul. 4, 2018, by the Chinese Patent Office in corresponding Chinese Patent Application No. 201480082651.8 and English translation of the Office Action. (15 pages).

Office Action dated Dec. 4, 2018, by the Chinese Patent Office in corresponding Chinese Patent Application No. 201480082651.8, and a machine English translation thereof.

Office Action (Communication pursuant to Article 94(3) EPC) dated Apr. 23, 2019, by the European Patent Office in corresponding European Patent Application No. 14904092.5. (9 pages).

* cited by examiner

ROTATING ELECTRICAL MACHINE WITH COOLING CHANNELS

TECHNICAL FIELD

The present invention relates to rotating electrical machines such as turbine generators and, more particularly, relates to an improvement in ventilation cooling performance in a rotor of a rotating electrical machine.

BACKGROUND ART

In a conventional rotating electrical machine having a cylindrical rotor, a slot axially passing through a rotor core is provided in plural numbers in the circumferential direction of the rotor core, a rotor winding that is a field winding is wound in a distributed winding manner and placed in each slot thereof, and a coil end portion of the rotor winding is arranged to be more projected than the core end face of the rotor core.

Furthermore, in the rotating electrical machine having the cylindrical rotor which is provided with a space by a narrow subslot and/or a U-shaped channel that supports the rotor winding on a slot bottom portion of each slot provided in the rotor core, refrigerant gas is ventilated in the space to cool the rotor winding.

In the conventional rotating electrical machine having the cylindrical rotor, the rotor having the subslot on the bottom portion of the slot of the rotor core improves cooling performance by arranging a streamlined body wedge block adjacent to the subslot. (For example, see Patent Document 1.)

Furthermore, in the rotor having the U-shaped channel on the bottom portion of the slot of the rotor core, a structure is made such that the projected end face of the U-shaped channel, which is more projected than the core end face of the rotor core, is axially projected than the projected end face of an adjacent interposed piece that is more projected than the core end face of the rotor core and the refrigerant gas becomes difficult to flow.

By the way, as the rotating electrical machine provided with the rotor having the U-shaped channel on the bottom portion of the slot of the rotor core, there is a configuration shown in, for example, FIG. 9 and FIG. 10. A rotor winding 3 is placed in a slot 2 of a rotor core 1 and a coil end portion of the rotor winding 3 is extended on the axially outer side than the core end face 1a of the rotor core 1. A U-shaped channel 4, which is touched to come into contact with a bottom portion of the rotor winding 3 and is axially extended, is arranged on a slot bottom portion 2a of the slot 2 of the rotor core 1; a projected end face 4a of the U-shaped channel 4 is projected on the axially outer side than the core end face 1a of the rotor core 1; and refrigerant gas is ventilated in the U-shaped channel 4 to cool the rotor winding 3.

A slot cell 5 is placed in the slot 2 of the rotor core 1; the rotor winding 3 and the U-shaped channel 4 in the slot 2 of the rotor core 1 are insulated from the rotor core 1 by the slot cell 5; the axial end face of the slot cell 5 is axially more projected than the core end face 1a of the rotor core 1 to insulate. In order to protect the slot cell 5, for example, the U-shaped channel 4 is projected on the axially outer side so that the projected end face 4a of the U-shaped channel 4 is the same as the projected end face of the slot cell 5.

An interposed piece 6 which is arranged between the rotor windings 3 at a portion more projected than the core end face 1a of the rotor core 1 is more projected than the core end face 1a of the rotor core 1 in a predetermined dimension, and is arranged to be extended in a straddle fashion over the rotor winding 3 and the U-shaped channel 4 to maintain each interval between the rotor windings 3 and between the U-shaped channels 4.

The projected end face 4a of the U-shaped channel 4 is arranged to be projected on the axially outer side by a value of P than the projected end face 6a of the interposed piece 6 in order to easily confirm a positional relationship after assembling peripheral components. Then, as shown by an arrow R1, the refrigerant gas is ventilated from the projected end face 4a side of the U-shaped channel 4 into the inside of the U-shaped channel 4 so as to cool the rotor winding 3.

PRIOR ART DOCUMENT

Patent Document

[Patent Document 1] JP-A-2007-282488 (Pages 6 to 9, FIG. 6)

SUMMARY OF THE INVENTION

Problems to be Solved by the Invention

In the aforementioned conventional rotating electrical machine, the projected end face 4a of the U-shaped channel 4 is arranged to be projected on the axially outer side than the projected end face 6a of the interposed piece 6 by the value of P in order to easily confirm the positional relationship after assembling the peripheral components. The projected end face 4a of the U-shaped channel 4 is more projected than the projected end face 6a of the interposed piece 6; and thus, the position of the U-shaped channel 4 can be visually confirmed; and mounting of the U-shaped channel 4 to a predetermined position is completed by measuring the dimension between the projected end face 4a of the U-shaped channel 4 and the projected end face 6a of the interposed piece 6 and setting the measured dimension to be the value of P.

As described above, the projected end face 4a of the U-shaped channel 4 is projected on the axially outer side than the projected end face 6a of the interposed piece 6; and accordingly, a problem exists in that the refrigerant gas into the inside of the U-shaped channel 4 is difficult to flow.

More specifically, the refrigerant gas is ventilated into the inside of the U-shaped channel 4 as shown by the arrow R1. However, since the projected portion of the U-shaped channel 4 serves as a wall, the refrigerant gas shown by an arrow R2 is not ventilated into the inside of the U-shaped channel 4; and accordingly, a problem exists in that the ventilation amount of the refrigerant gas into the inside of the U-shaped channel 4 is limited and cooling performance of the rotor winding 3 is not sufficient.

The present invention has been made to solve the above described problem, and an object of the present invention is to provide a rotating electrical machine that can improve cooling performance by providing the projected end face of a U-shaped channel on the axially inner side than the projected end face of an interposed piece.

Means for Solving the Problems

According to the present invention, there is provided a rotating electrical machine including: a rotor core in which a slot axially passing therethrough is provided in plural numbers in a circumferential direction; a rotor winding which is placed in the slot provided in the rotor core, and whose coil end portion is extended on the axially outer side than the core end face of the rotor core; a U-shaped channel which is arranged on a slot bottom portion of the slot of the rotor core, is touched to come into contact with a bottom portion of the rotor winding, and is axially extended to be projected on the axially outer side than the core end face of the rotor core; a slot cell which is placed in the slot of the rotor core, and insulates the rotor winding and the U-shaped channel in the slot of the rotor core from the rotor core; and an interposed piece arranged between the rotor windings at a portion more projected than the core end face of the rotor core. The projected end face of the U-shaped channel is arranged on the axially inner side than the projected end face of the interposed piece.

Advantageous Effect of the Invention

According to the rotating electrical machine of the present invention, the projected end face of the U-shaped channel is provided on the axially inner side than the projected end face of the interposed piece, whereby there can be obtained the rotating electrical machine which can reduce pressure loss at the projected end face portion of the U-shaped channel and can improve cooling performance.

MODE FOR CARRYING OUT THE INVENTION

Embodiment 1

Figure 1:
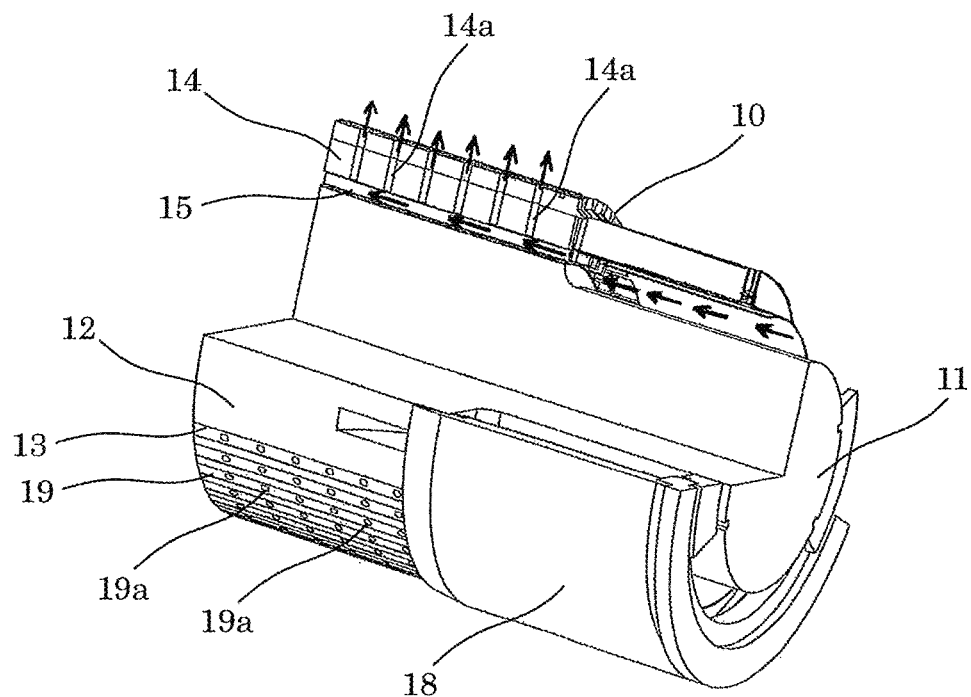
FIG. 1 is a bird's-eye view showing a rotating electrical machine according to Embodiment 1 of the present invention.
Figure 2:
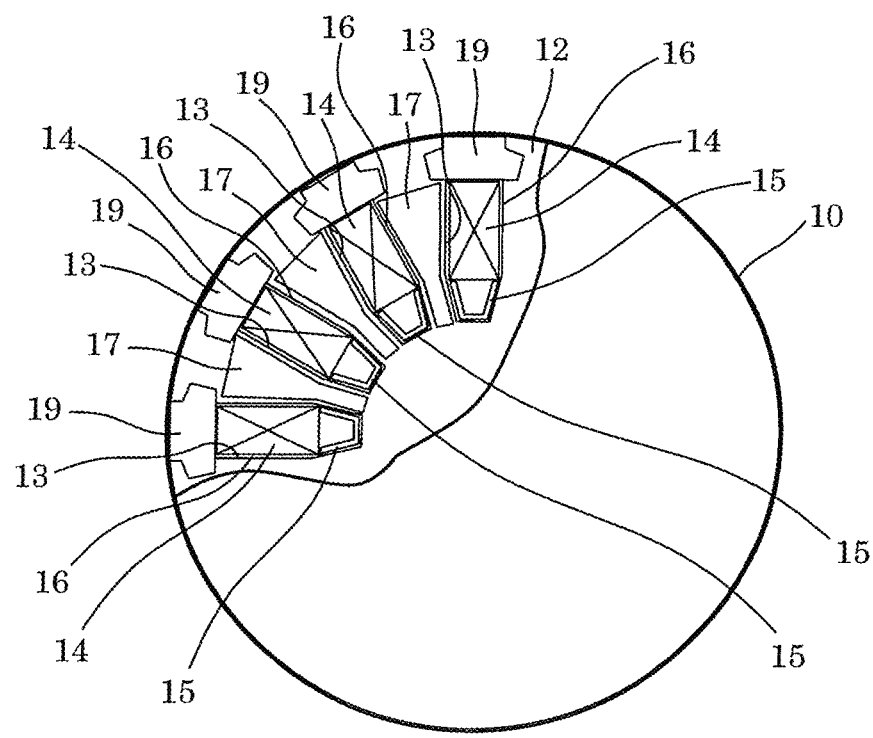
FIG. 2 is a sectional view showing the rotating electrical machine according to Embodiment 1 of the present invention.
Figure 3:
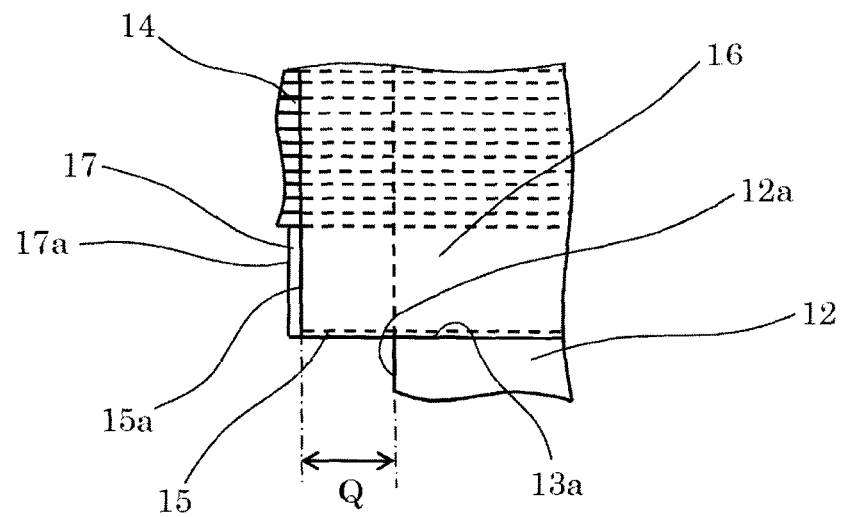
FIG. 3 is a relevant part sectional view showing a relevant part of the rotating electrical machine according to Embodiment 1 of the present invention.
Figure 4:
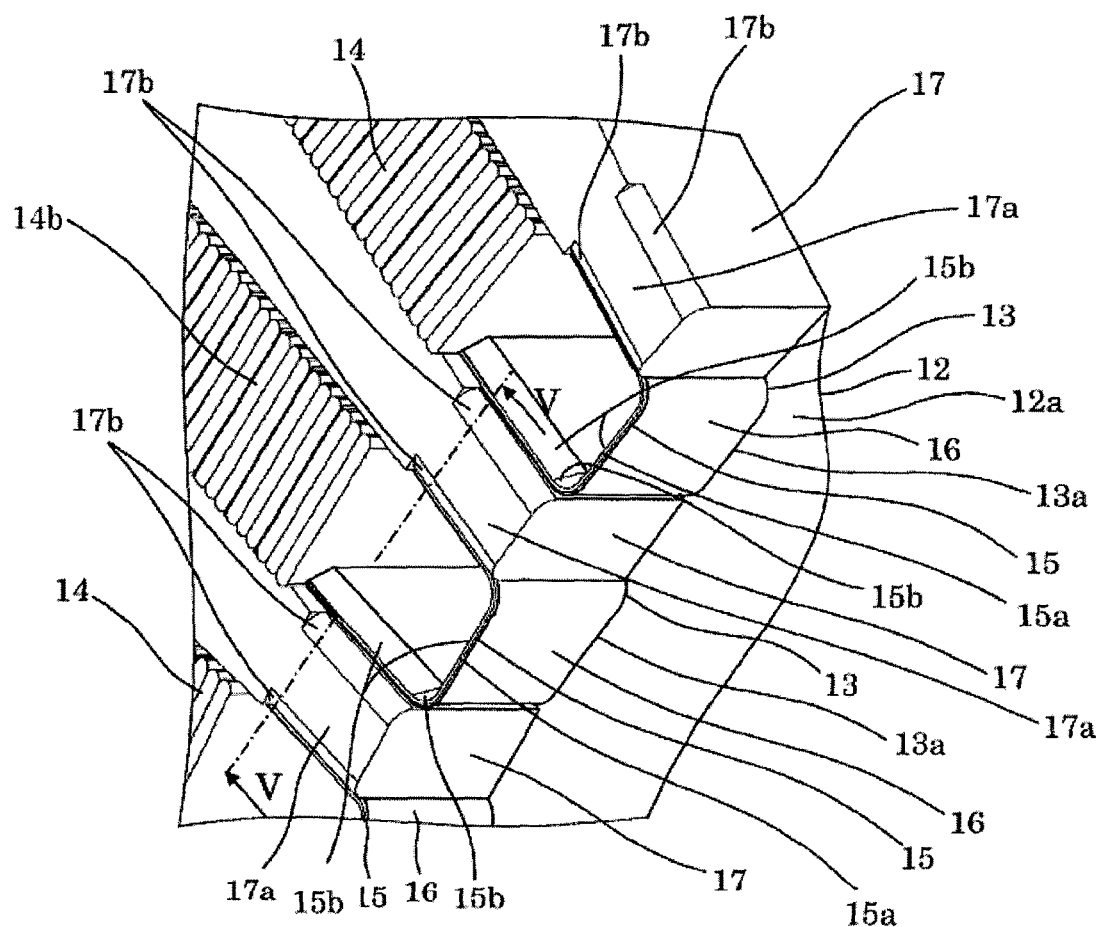
FIG. 4 is a bird's-eye view showing a relevant part of the rotating electrical machine according to Embodiment 1 of the present invention.
Figure 5:
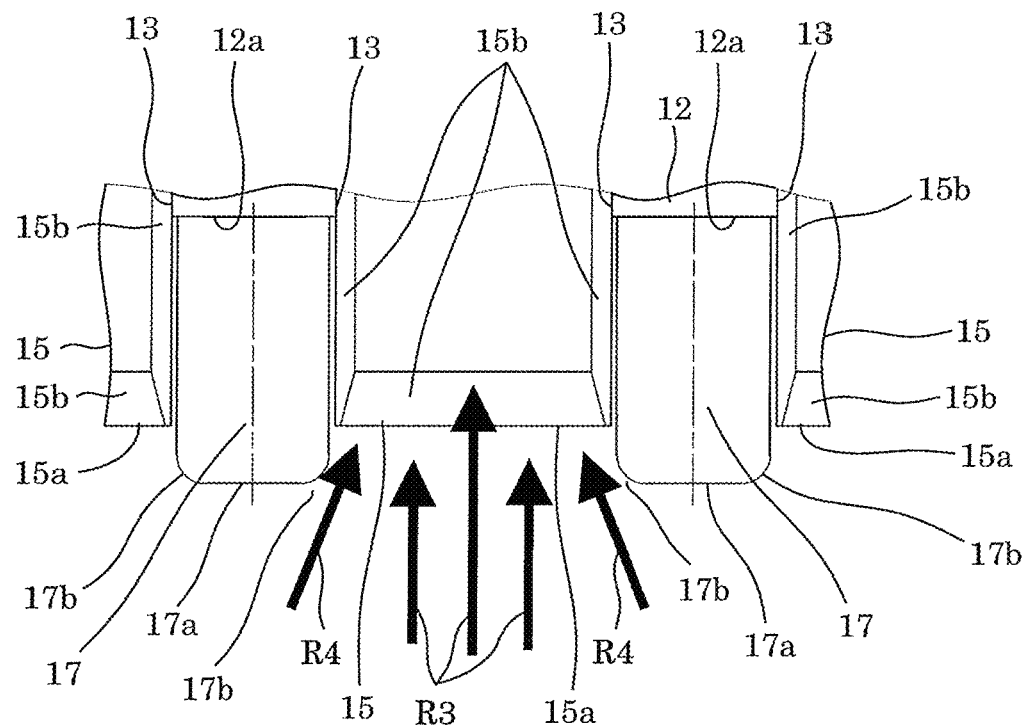
FIG. 5 is a sectional view taken along the line V-V of FIG. 4 showing the rotating electrical machine according to Embodiment 1 of the present invention.

Hereinafter, Embodiment 1 of the present invention will be described on the basis of FIG. 1 to FIG. 5. Then, in each of the drawings, identical or equivalent members and portions will be described with the same reference numerals (and letters) assigned thereto. FIG. 1 is a bird s-eye view showing a rotating electrical machine according to Embodiment 1 of the present invention. FIG. 2 is a sectional view showing the rotating electrical machine according to Embodiment 1 of the present invention. FIG. 3 is a relevant part sectional view showing a relevant part of the rotating electrical machine according to Embodiment 1 of the present invention. FIG. 4 is a bird's-eye view showing a relevant part of the rotating electrical machine according to Embodiment 1 of the present invention. FIG. 5 is a sectional view taken along the line V-V of FIG. 4 showing the rotating electrical machine according to Embodiment 1 of the present invention.

In these respective drawings, a rotor 10 of the rotating electrical machine includes: a rotor core 12 positioned in a central portion of a rotor shaft 11; a slot 13 which axially passes through the rotor core 12 and is provided in plural numbers in the circumferential direction of the rotor core 12; a rotor winding 14 which is placed in each slot 13, and whose coil end portion 14b is arranged to be extended on the axially outer side than the core end face of 12a of the rotor core 12; a U-shaped channel 15 which is arranged on a slot bottom portion 13a of the slot 13 of the rotor core 12, is touched to come into contact with a bottom portion of the rotor winding 14, and is axially extended to be projected on the axially outer side than the core end face of 12a of the rotor core 12; a slot cell 16 which is placed in the slot 13 of the rotor core 12, and insulates the rotor winding 14 and the U-shaped channel 15 in the slot 13 of the rotor core 12 from the rotor core 12; and an interposed piece 17 arranged between the rotor windings 14 at a portion more projected than the core end face of 12a of the rotor core 12. The interposed piece 17 is extended to, for example, between the U-shaped channels 15.

The projected end face 15a of the U-shaped channel 15 is arranged on the axially inner side than the projected end face 17a of the interposed piece 17 to reduce pressure loss of ventilation of refrigerant gas at the projected end face 15a portion of the U-shaped channel 15. Then, a chamfered portion 15b is formed on the projected end face 15a portion of the U-shaped channel 15 to further reduce the pressure loss of the ventilation of the refrigerant gas to the projected end face 15a portion of the U-shaped channel 15. Furthermore, a chamfered portion 17b is also formed on the projected end face 17a portion of the interposed piece 17 to further more reduce the pressure loss of the ventilation of the refrigerant gas to the projected end face 15a portion of the U-shaped channel 15. The projected end face 15a of the U-shaped channel 15 is arranged to be positioned on the axially inner side than the chamfered portion 17b of the projected end face 17a portion of the interposed piece 17.

A retaining ring 18 that retains the coil end portions of the rotor windings 14 is arranged on the rotor shaft 11; and the rotor windings 14 placed in the slots 13 of the rotor core 12 are each fixed by a rotor wedge 19. The rotor winding 14 is formed with radial coil ventilation holes 14a each communicated with the inside of the U-shaped channel 15; and the rotor wedge 19 is formed with wedge ventilation holes 19a each communicated with the coil ventilation hole 14a of the rotor winding 14.

Next, operation will be described. The refrigerant gas is flown in from between the rotor shaft 11 and the retaining ring 18, and is axially ventilated from the projected end face 15a portion of the U-shaped channel 15 into the inside of the U-shaped channel 15. Then, the refrigerant gas is radially ventilated from the U-shaped channel 15 to the coil ventilation holes 14a of the rotor winding 14, and is flown out from the wedge ventilation holes 19a of the rotor wedge 19 to the surface of the rotor 10 to cool the rotor winding 14.

In this Embodiment 1, confirmation of the mounting position of the U-shaped channel 15 can be confirmed by mounting the U-shaped channel 15 so as to be a value of Q that is the projection amount of the projected end face 15*a* of the U-shaped channel 15 from the core end face of 12*a* of the rotor core 12; and therefore, the projected end face 15*a* of the U-shaped channel 15 can be arranged on the axially inner side than the projected end face 17*a* of the interposed piece 17 and the pressure loss of the ventilation of the refrigerant gas at the projected end face 15*a* portion of the U-shaped channel 15 can be reduced.

More specifically, the refrigerant gas is ventilated into the inside of the U-shaped channel 15 as shown by an arrow R3 and an arrow R4, the refrigerant gas of the arrow R3 is easily flown into the inside of the U-shaped channel 15 by the chamfered portion 15*b* formed on the projected end face 15*a* portion of the U-shaped channel 15; and therefore, as compared to the aforementioned conventional rotating electrical machine, the ventilation amount of the refrigerant gas is R3>R1. Then, the projected end face 15*a* of the U-shaped channel 15 is arranged on the axially inner side than the chamfered portion 17*b* of the projected end face 17*a* of the interposed piece 17 and therefore the refrigerant gas of R4 can be ventilated into the inside of the U-shaped channel 15 in this Embodiment, although the refrigerant gas of R2 cannot be ventilated into the inside of the U-shaped channel 4 in the aforementioned conventional rotating electrical machine. Therefore, as compared to the aforementioned conventional rotating electrical machine, the ventilation amount of the refrigerant gas can be (R3+R4)>R1, the ventilation amount of the refrigerant gas into the inside of the U-shaped channel 15 can be considerably increased, and cooling performance of the rotor winding 14 can be remarkably improved.

Then, the chamfered portion 15*b* is formed on the projected end face 15*a* portion of the U-shaped channel 15, the chamfered portion 17*b* is also formed on the projected end face 17*a* portion of the interposed piece 17, and the pressure loss of the ventilation of the refrigerant gas to the projected end face 15*a* portion of the U-shaped channel 15 is further reduced; and therefore, the cooling performance of the rotor winding 14 can be further more improved.

The pressure loss of the ventilation of the refrigerant gas to the projected end face 15*a* portion of the U-shaped channel 15 is confirmed by computational fluid dynamics (CFD) analysis and a model verification test. As a model, modeling is performed from an inlet of the retaining ring→the projected end face portion of the U-shaped channel→to the inside (about 1 m) of the U-shaped channel; and as a condition, the confirmation is performed by a rotational frequency of 3600 min$^{-1}$ (rated rotational frequency), an inlet air velocity of about 20 m/s, and air serving as the refrigerant gas. As a result, when the pressure loss at the projected end face 4*a* portion of the aforementioned conventional U-shaped channel 4 is 100%, the pressure loss at the projected end face 15*a* portion of the U-shaped channel 15 in this Embodiment becomes about 35% and about 65% of the pressure loss can be reduced.

As described above, since the pressure loss of the ventilation of the refrigerant gas to the projected end face 15*a* portion of the U-shaped channel 15 can be considerably reduced, the refrigerant gas can be efficiently ventilated into the inside of the U-shaped channel 15. This can remarkably increase the flow-in amount of the refrigerant gas into the inside of the U-shaped channel 15 and can remarkably improve the cooling performance of the rotor winding 14.

Furthermore, the projected end face 15*a* of the U-shaped channel 15 is arranged on the axially inner side than the projected end face 17*a* of the interposed piece 17; and thus, the U-shaped channel 15 can be shortened and a reduction in costs can be achieved.

Embodiment 2

Figure 6:
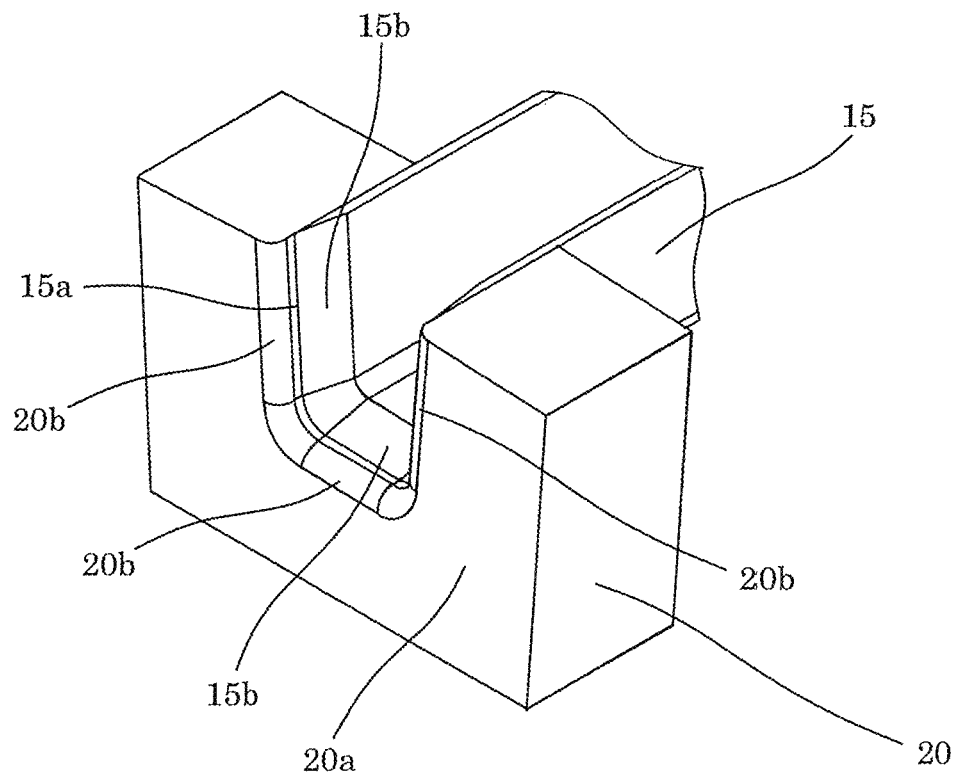
FIG. 6 is a bird's-eye view showing a relevant part of a rotating electrical machine according to Embodiment 2 of the present invention.

Embodiment 2 of the present invention will be described on the basis of FIG. 6. FIG. 6 is a bird's-eye view showing a relevant part of a rotating electrical machine according to Embodiment 2 of the present invention.

In this Embodiment 2, there is provided a block 20 that covers a U-shaped channel 15 at an adjacent portion of an interposed piece 17 extended to between U-shaped channels 15; a chamfered portion 20*b* is formed on a projected end face 20*a* of a block 20; and a projected end face 15*a* of the U-shaped channel 15 is arranged to be positioned on the axially inner side than the chamfered portion 20*b* of the projected end face 20*a* of the block 20.

Also in this Embodiment 2, the projected end face 15*a* of the U-shaped channel 15 is arranged to be positioned on the axially inner side than the chamfered portion 20*b* of the projected end face 20*a* of the block 20; and thus, pressure loss of ventilation of refrigerant gas to the projected end face 15*a* portion of the U-shaped channel 15 is reduced and therefore the same effect as the aforementioned Embodiment 1 can be exhibited.

Embodiment 3

Figure 7:
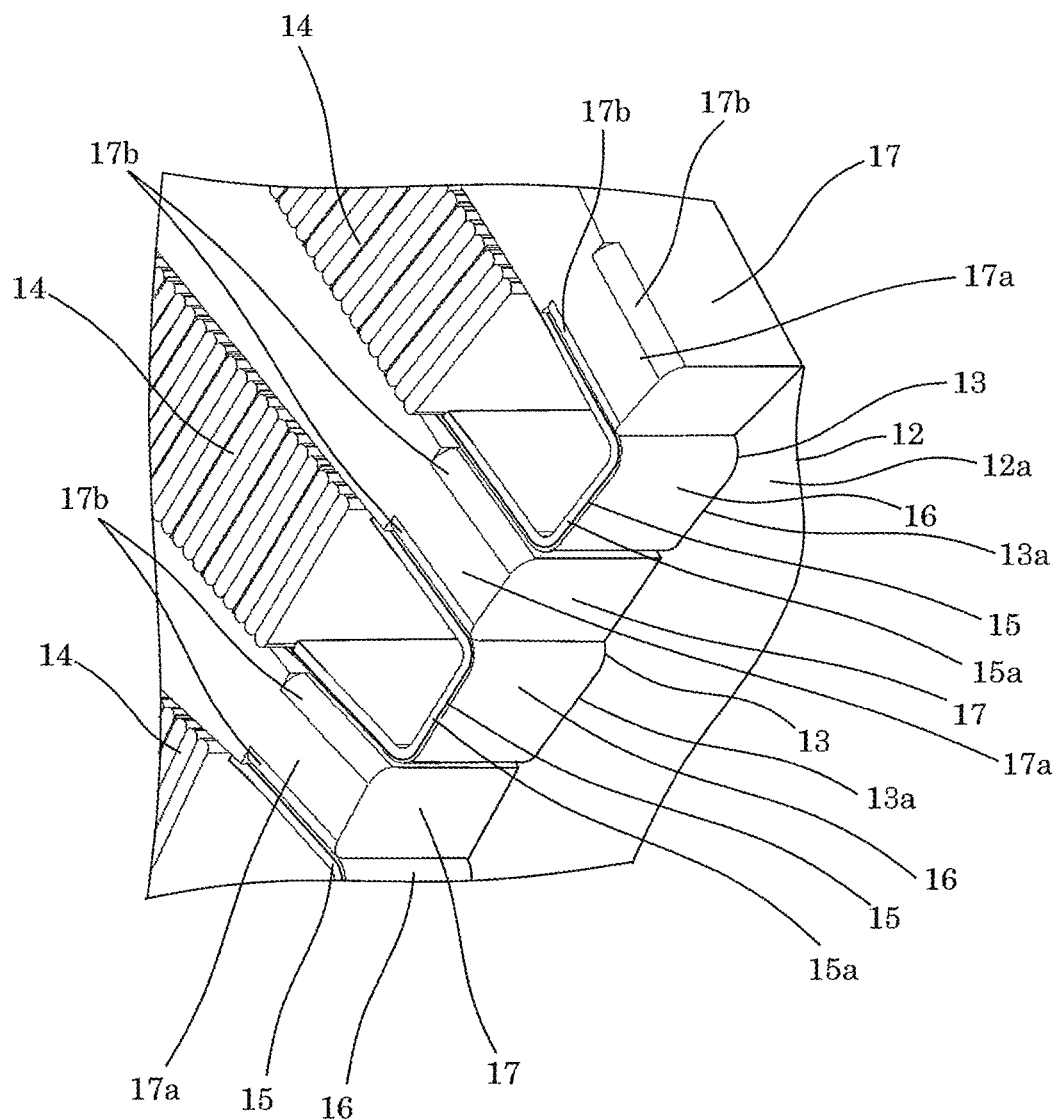
FIG. 7 is a bird's-eye view showing a relevant part of a rotating electrical machine according to Embodiment 3 of the present invention.

Embodiment 3 of the present invention will be described on the basis of FIG. 7. FIG. 7 is a bird's-eye view showing a relevant part of a rotating electrical machine according to Embodiment 3 of the present invention.

In the aforementioned Embodiment 1, the description has been made on the case where the chamfered portion 15*b* is formed on the projected end face 15*a* portion of the U-shaped channel 15 and the chamfered portion 17*b* is formed on the projected end face 17*a* portion of the interposed piece 17. However, this Embodiment 3 is configured such that a chamfered portion is formed on only either a projected end face 15*a* portion of a U-shaped channel 15 or a projected end face 17*a* portion of an interposed piece 17; and as an example, the drawing represents that a chamfered portion 15*b* is not formed on the projected end face 15*a* portion of the U-shaped channel 15, but a chamfered portion 17*b* is formed on only the projected end face 17*a* portion of the interposed piece 17.

Also in this Embodiment 3, since the projected end face 15*a* of the U-shaped channel 15 is arranged to be positioned on the axially inner side than the projected end face 17*a* of the interposed piece 17, pressure loss of ventilation of refrigerant gas to the projected end face 15*a* portion of the U-shaped channel 15 can be reduced and therefore the same effect as the aforementioned Embodiment 1 can be exhibited.

Embodiment 4

Figure 8:
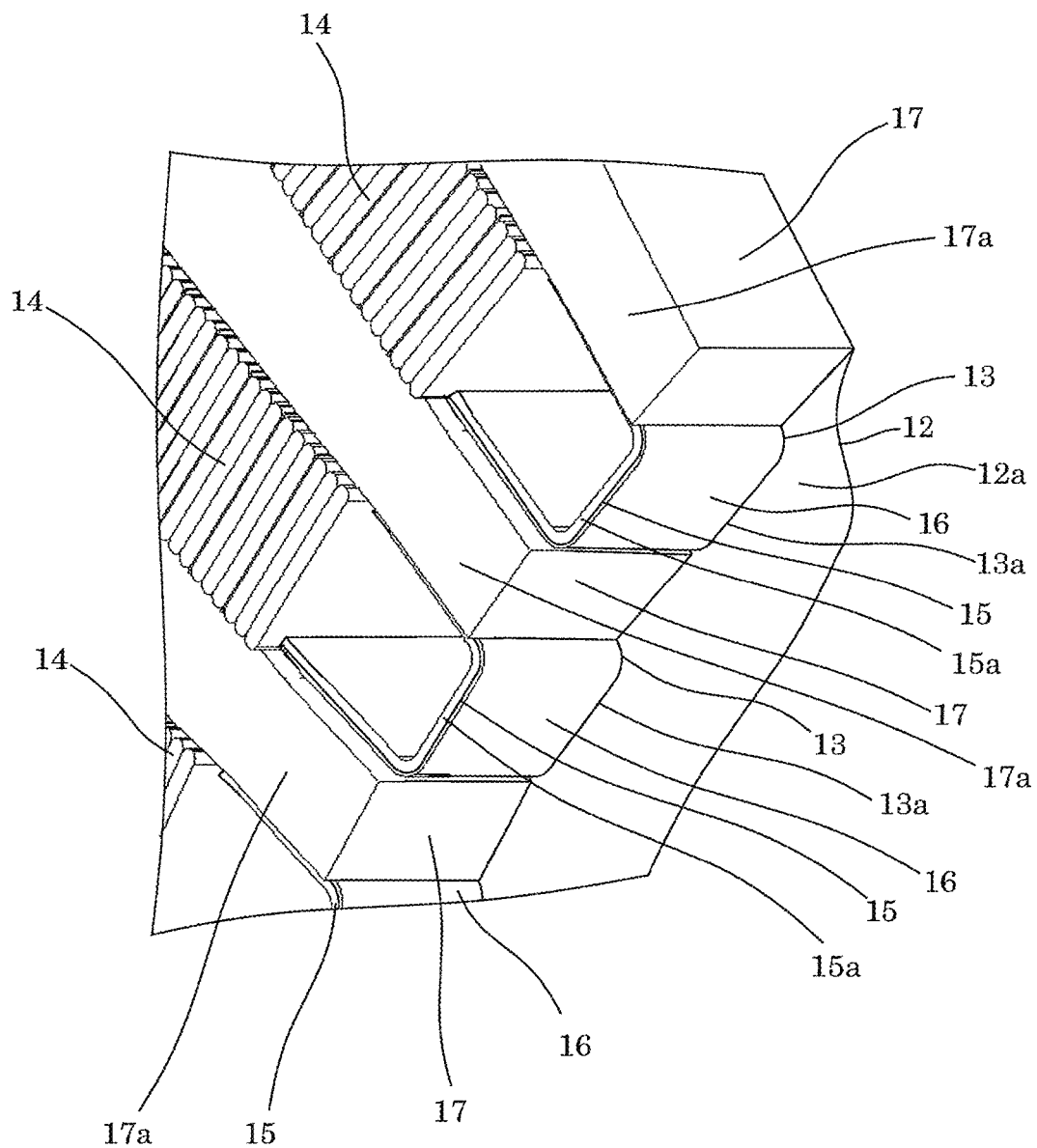
FIG. 8 is a bird's-eye view showing a relevant part of a rotating electrical machine according to Embodiment 4 of the present invention.
Figure 9:
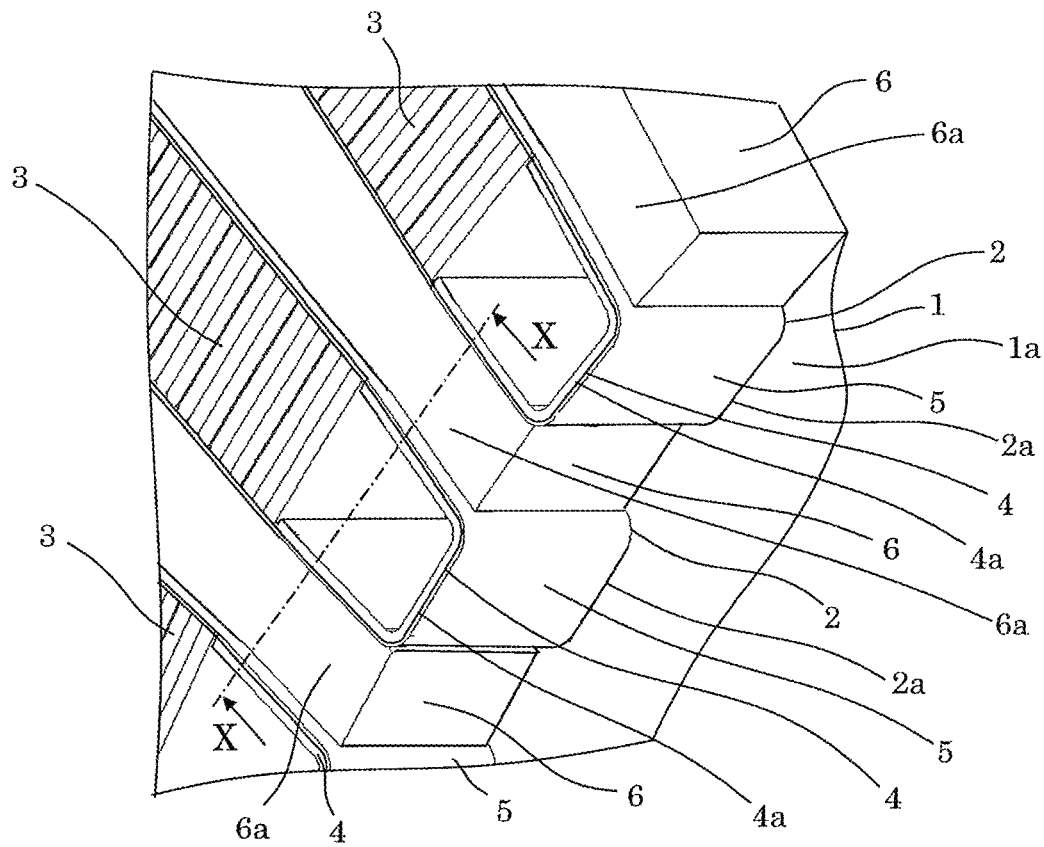
FIG. 9 is a bird's-eye view showing a relevant part of a conventional rotating electrical machine.
Figure 10:
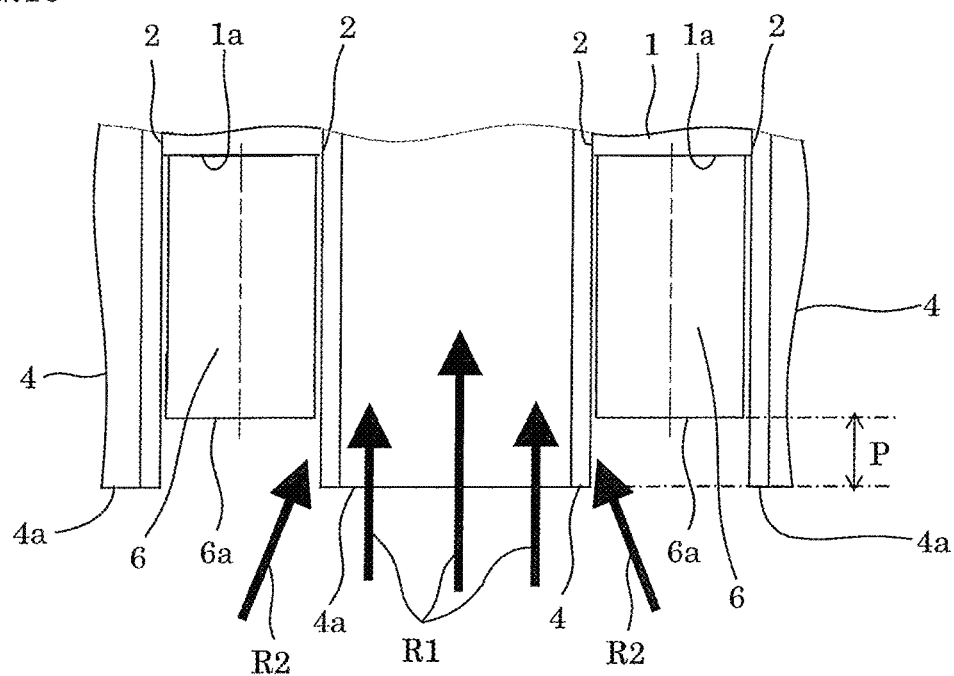
FIG. 10 is a sectional view taken along the line X-X of FIG. 9 showing the conventional rotating electrical machine.

Embodiment 4 of the present invention will be described on the basis of FIG. 8. FIG. 8 is a bird's-eye view showing a relevant part of a rotating electrical machine according to Embodiment 4 of the present invention.

In the aforementioned Embodiment 1, the description has been made on the case where the chamfered portion 15*b* is formed on the projected end face 15*a* portion of the U-shaped channel 15 and the chamfered portion 17b is formed on the projected end face 17a portion of the interposed piece 17. However, in this Embodiment 4, a chamfered portion is not formed on a projected end face 15a portion of a U-shaped channel 15 and a projected end face 17a portion of an interposed piece 17.

Also in this Embodiment 4, since the projected end face 15a of the U-shaped channel 15 is arranged to be positioned on the axially inner side than the projected end face 17a of the interposed piece 17, pressure loss of ventilation of refrigerant gas to the projected end face 15a portion of the U-shaped channel 15 can be reduced and therefore the same effect as the aforementioned Embodiment 1 can be exhibited.

Incidentally, the present invention can freely combine the respective embodiments and appropriately modify and/or omit the respective embodiments, within the scope of the present invention.

INDUSTRIAL APPLICABILITY

The present invention is suitable for actualizing a rotating electrical machine which can reduce pressure loss of refrigerant gas at a projected end face portion of a U-shaped channel and can improve cooling performance.

The invention claimed is:

1. A rotating electrical machine comprising:
a rotor core including a rotation axis in which a slot passing parallel to the rotation axis therethrough is provided in plural numbers in a circumferential direction;
a rotor winding placed in each slot provided in said rotor core, and having a coil axial end portion that is more projected outwardly from the rotor core and parallel to the rotation axis than a core axial end face of said rotor core;
a U-shaped channel arranged on a slot bottom portion of each slot of said rotor core, contacting a bottom portion of said respective rotor winding, and having an axial end face that is more projected outwardly from the rotor core and parallel to the rotation axis than the core axial end face of said rotor core;
a slot cell placed in each slot of said rotor core for insulating said respective rotor winding and respective U-shaped channel in each slot of said rotor core from said rotor core; and
an interposed piece arranged between coil axial end portions of adjacent rotor windings and having an axial end face that is more projected outwardly from the rotor core and parallel to the rotation axis than the core axial end face of said rotor core, and an interval of each of the coil axial end portions of the adjacent rotor windings is maintained,
wherein the axial end face of each interposed piece projects outwardly further from the rotor core, parallel to the rotation axis, than the axial end face of each U-shaped channel.

2. The rotating electrical machine according to claim 1, wherein each interposed piece is arranged to be extended between respective adjacent U-shaped channels.

3. The rotating electrical machine according to claim 2, wherein a chamfered portion is formed on the axial end face portion of each U-shaped channel, the chamfer being arranged in a direction parallel to the rotation axis.

4. The rotating electrical machine according to claim 2, wherein a chamfered portion is formed on the axial end face portion of each interposed piece, the chamfer being arranged in a direction parallel to the rotation axis.

5. The rotating electrical machine according to claim 4, wherein the axial end face of each U-shaped channel is arranged more inwardly from the rotor core and parallel to the rotation axis than the chamfered portion of each interposed piece.

6. The rotating electrical machine according to claim 2, wherein a chamfered portion is formed on each of said U-shaped channel and each interposed piece, the chamfer being arranged in a direction parallel to the rotation axis.

7. The rotating electrical machine according to claim 6, wherein the axial end face of each U-shaped channel is arranged more inwardly from the rotor core and parallel to the rotation axis than the chamfered portion of each interposed piece.

8. The rotating electrical machine according to claim 2, wherein an adjacent portion of each interposed piece extended between respective adjacent U-shaped channels serves as a block that covers said U-shaped channels.

9. The rotating electrical machine according to claim 1, wherein a chamfered portion is formed on the axial end face portion of each U-shaped channel, the chamfer being arranged in a direction parallel to the rotation axis.

10. The rotating electrical machine according to claim 1, wherein a chamfered portion is formed on the axial end face portion of each interposed piece, the chamfer being arranged in a direction parallel to the rotation axis.

11. The rotating electrical machine according to claim 10, wherein the axial end face of each U-shaped channel is arranged more inwardly from the rotor core and parallel to the rotation axis than the chamfered portion of each interposed piece.

12. The rotating electrical machine according to claim 1, wherein a chamfered portion is formed on each of said U-shaped channel and each interposed piece, the chamfer being arranged in a direction parallel to the rotation axis.

13. The rotating electrical machine according to claim 12, wherein the axial end face of each U-shaped channel is arranged more inwardly from the rotor core and parallel to the rotation axis than the chamfered portion of each interposed piece.

* * * * *